Figure 1:
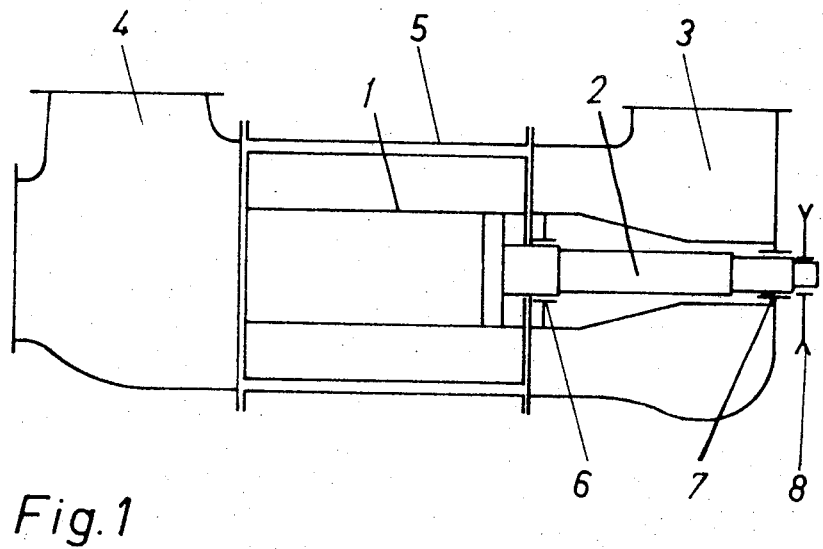

United States Patent
Wunsch

[11] 3,746,128
[45] July 17, 1973

[54] PROCEDURE FOR IMPROVING THE SEALING OF AN AERODYNAMIC PRESSURE WAVE MACHINE AND A DEVICE TO EFFECT THE PROCEDURE

[75] Inventor: Alfred Wunsch, Friedberg, Germany

[73] Assignee: Aktiengesellschaft Brown, Boveri & Cie., Baden, Switzerland

[22] Filed: Sept. 28, 1971

[21] Appl. No.: 184,455

[30] Foreign Application Priority Data
Oct. 29, 1970 Switzerland.................. 15978/70

[52] U.S. Cl................ 184/6.11, 277/22, 308/187.1
[51] Int. Cl. .................... F02f 11/00, F16c 33/76
[58] Field of Search.............. 277/DIG. 8, 13, 22; 308/187, 187.1, 36.3, 36.4; 184/6.11, 104 R

[56] References Cited
UNITED STATES PATENTS

| | | | |
|---|---|---|---|
| 3,597,024 | 8/1971 | Singlemann............... | 184/6.11 X |
| 3,016,251 | 1/1962 | Gilbert...................... | 277/13 |
| 2,956,824 | 10/1960 | Kuchler et al............ | 277/22 X |
| 2,846,245 | 8/1958 | Weaver..................... | 277/22 |
| 2,827,344 | 3/1958 | Maag........................ | 308/187.1 |
| 2,067,191 | 1/1937 | Hudson..................... | 308/187 X |

FOREIGN PATENTS OR APPLICATIONS
207,709  9/1966  Sweden................ 277/DIG. 8

*Primary Examiner*—Manuel A. Antonakas
*Attorney*—Pierce et al.

[57] ABSTRACT

In sealing an aerodynamic pressure-wave machine including a sealing ring between a rotor, supported by an overhung bearing at its cooler end and consisting of at least one cell wheel and shaft, and the rotor-side bearing of the machine, improved sealing is secured by cooling the sealing ring with sprayed oil, the oil escaping from the sealing ring being conducted to the hot end of the cell wheel.

5 Claims, 2 Drawing Figures

PROCEDURE FOR IMPROVING THE SEALING OF AN AERODYNAMIC PRESSURE WAVE MACHINE AND A DEVICE TO EFFECT THE PROCEDURE

The invention concerns a procedure for improving the seal, incorporating a sealing ring, between a rotor, supported by an overhung bearing at its cooler end and consisting of at least a cell wheel and shaft, and the rotor-side bearing of an aerodynamic pressure-wave machine, together with a device to effect the procedure.

The rotor of an aerodynamic pressure-wave machine incorporates extended cells, open at the ends, which move past stationary inlet and exhaust ducts when the machine is in operation. These ducts are usually contained in stator housings, the ends of which are adjacent to the rotor, the housing with ducts for the hot gases being at one end, and the housing with ducts for the cold air being at the other end. The rotor is normally supported on overhung bearings in the air housing. The bearings, whether of the plain or rolling type, must be supplied with lubricating oil which must be prevented by means of a seal from entering the rotor cells. When pressure-wave machines are used for charging diesel engines, for example, in transient conditions, both no-load and partial load, exhaust gas containing soot also penetrates to the cold air end of the rotor. If the walls of the rotor cells are wetted with oil, the soot adheres firmly and an oily coating of increasing thickness is formed which eventually impairs the characteristic and efficiency of the machine. These difficulties do not arise at the hot end of the rotor because here both the soot and the oil burn and the cell walls therefore remain clean.

The seals used to prevent oil escaping from the bearing chamber to the rotor and the drive are in the form of stationary rubber sealing rings, the elastic sealing edge of which is pressed radially on the rotating shaft by means of a spring. The seal at the rotor end then creates difficulties because it is exposed to relatively high ambient temperatures. Also, the "cold" air housing attains temperatures up to 180° C. At these temperatures the rubber becomes brittle and cracks, allowing lubricating oil to escape and thus cause the fouling described.

The purpose of the invention is to protect the sealing ring and to preserve its sealing properties by lowering its operating temperature, and to prevent fouling of the cell walls by escaping oil.

In accordance with the invention this purpose is achieved through the fact that the sealing ring is cooled by sprayed oil and oil escaping at the sealing ring is led to the hot end of the cell wheel.

A device to effect this procedure is characterized by an arrangement allowing oil-spray cooling of the sealing ring and by oil deflector plates which guide escaped oil into the hollow hub of the cell wheel.

The measures improve the reliability of the machine considerably and bring about economic advantages because the times between inspections can be extended. When the pressure-wave machine is used as a charging device its fault-free operation also improves the reliability and availability of the associated internal combustion engine.

Figure 2:
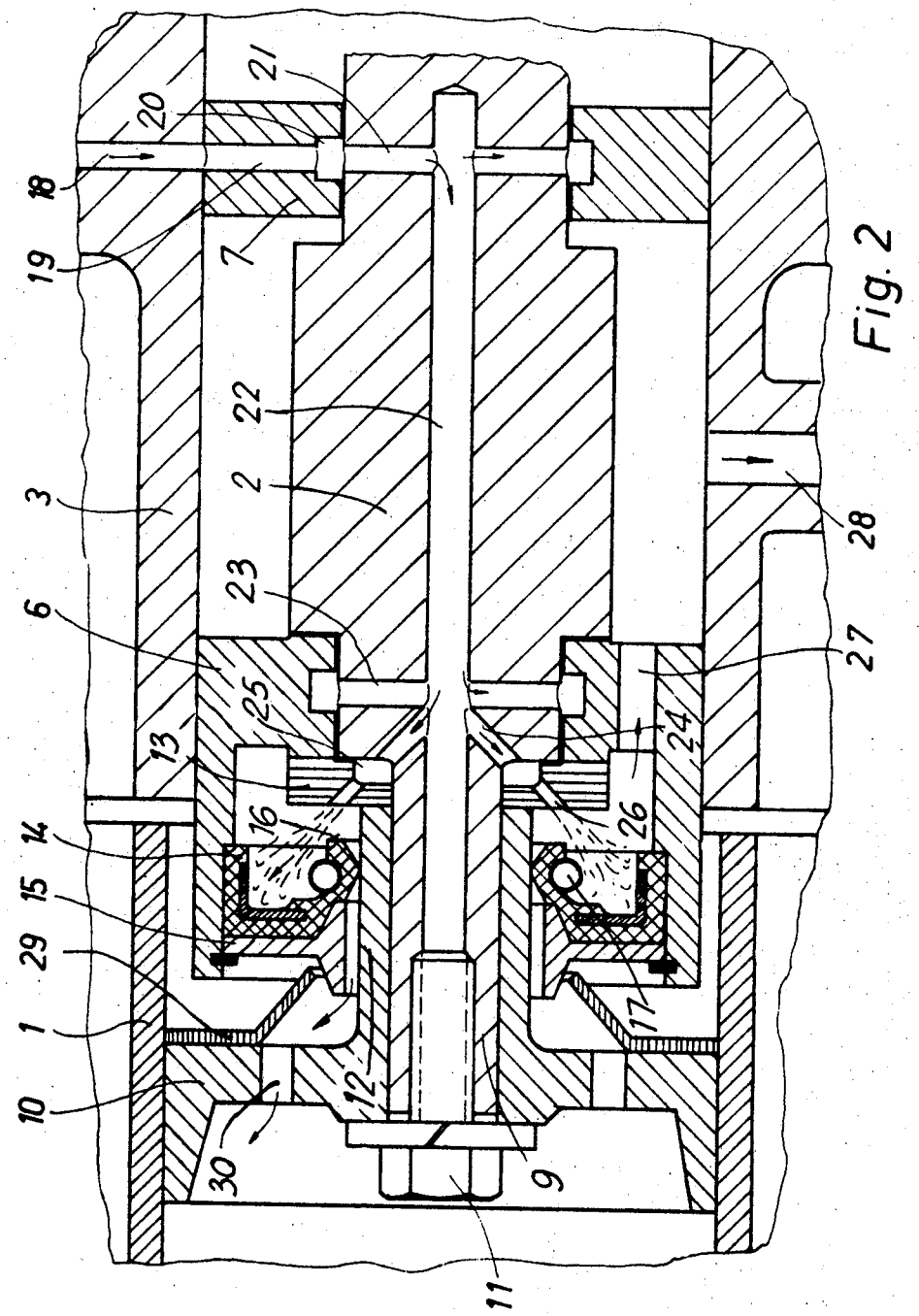

An example of the invention is illustrated by the diagrams. These show:

FIG. 1 a longitudinal section through a pressure-wave machine, showing the arrangement in schematic form, FIG. 2 a detail of FIG. 1 on a larger scale.

Referring to FIG. 1, the rotor, consisting of cell wheel 1 and shaft 2, turns in a stator composed of air housing 3, gas housing 4 and outer casing 5. The rotor is supported in overhung bearings 6 and 7, the drive being provided by wheel 8.

FIG. 2 shows an enlarged portion of FIG. 1 with shaft 2 and the two bearings 6 and 7, which are depicted as plain bearings. Hub disc 10 fits over the recessed portion 9 of shaft 2 and is fixed by screw 11. Thrust bearing ring 13 is held between a step in shaft 2 and the hub 12 of hub disc 10.

Rotor-side bearing 6 incorporates sealing ring 14, which is generally of rubber. It bears against oil deflector plate 15, which is prevented from moving axially. The sealing edge 16 of the sealing ring is pressed on rotating hub 12 by circular spring 17.

Oil for lubricating the bearings flows through duct 18 in air housing 3 and duct 19 in bearing 7 to annular slot 20, which supplies pressurized oil to bearing 7. From annular slot 20 the oil passes through shaft ducts 21 and 22 to port 23, through which oil is fed to bearing 6. Shaft duct 22, however, also has branch ducts 24 which lead to the annular space 25 in thrust ring 13. Owing to the pressure of the oil, and also centrifugal force, the oil leaves annular space 25 through ports 26 and sprays on sealing ring 14. Since the oil temperature is approximately 90° C and the temperature of the sealing ring at the sealing edge can be as much as 200° C, cooling is very effective.

The spray oil is led away through ports 27 in bearing 6 and port 28 in air housing 3. Should an error in assembly or excessive thermal stress result in an imperfect seal between stationary sealing edge 16 and rotating hub 12, oil escapes between hub 12 and oil deflector plate 15 and is intercepted by oil deflector plate 29. The escaped oil passes through ports 30 into the hollow hub of cell wheel 1 and flows towards the hot end of the cell wheel, where it burns. In this way the escaped oil is prevented from reaching the cold, bearing end of the cell wheel and there giving rise to fouling.

Under certain circumstances it may be preferable to conduct the spray oil to the sealing ring along a different path, e. g. through the air housing or through the bearing block, from where it would spray through one or more nozzles on to the sealing ring. Also, the oil must not be diverted from the oil lubricating the bearings, although it is simpler if there is only one oil system.

I claim:

1. An aerodynamic pressure wave machine comprising a rotor having a hollow hub and a cell wheel, a shaft projecting from one end of said rotor and which is supported by an overhung bearing, a housing for a relatively cool gas disposed adjacent said cell wheel at the overhung bearing end of said rotor, a relatively hot gas housing disposed adjacent the opposite end of said rotor, a sealing ring surrounding and in contact with said rotor shaft at the rotor side of said bearing, means providing a flow path for a coolant oil to and from said sealing ring, and means providing a flow path directing any of the oil as may happen to escape said sealing ring away from the cold end of said cell wheel and into said hollow hub for flow therethrough to the hot end of said cell wheel.

2. An aerodynamic pressure wave machine as defined in claim 1 wherein said means providing a flow path directing escape coolant oil into said hollow hub includes deflector plates which prevent the oil from reaching the surfaces of said cell wheel at the cold end thereof.

3. An aerodynamic pressure wave machine as defined in claim 1 where the coolant oil is delivered to said sealing ring in spray form.

4. An aerodynamic pressure wave machine as defined in claim 1 wherein the coolant oil is delivered to said sealing ring through ducts provided within said rotor shaft.

5. An aerodynamic pressure wave machine as defined in claim 1 and which further includes means providing a flow path for pressurized oil to and from said overhung bearing and which is conducted to the bearing for lubricating the same through internal ducts provided in said rotor shaft, the coolant oil for said sealing ring being supplied thereto from the same internal duct system within said rotor shaft as supplies said overhung bearing.

* * * * *